United States Patent [19]

Hunter

[11] Patent Number: 4,768,642
[45] Date of Patent: Sep. 6, 1988

[54] MULTIPLE CONVEYORS WITH OVERLAPPING MATERIAL HANDLING DEVICE PATHS

[75] Inventor: Stefan A. Hunter, Outagamie County, Wis.

[73] Assignee: Kimberly-Clark Corporation, Neenah, Wis.

[21] Appl. No.: 63,551

[22] Filed: Jun. 16, 1987

[51] Int. Cl.⁴ .................................................. B65G 47/26
[52] U.S. Cl. .................................. 198/425; 198/484.1; 198/570
[58] Field of Search ............... 198/425, 429, 430, 570, 198/801.1, 484.1; 53/439, 529, 542

[56] References Cited

U.S. PATENT DOCUMENTS

| | | | |
|---|---|---|---|
| 1,815,372 | 7/1931 | Frazier | 198/803.1 |
| 2,923,392 | 2/1960 | Gabrielsen | 194/2 |
| 3,219,171 | 11/1965 | Finger | 198/40 |
| 3,476,231 | 11/1969 | Bower | 198/19 |
| 3,542,215 | 11/1970 | Fromme et al. | 214/11 |
| 3,608,775 | 9/1971 | Offutt | 221/84 |
| 4,180,154 | 12/1979 | Andersson | 198/425 |
| 4,238,027 | 12/1980 | Oelte | 198/504 |
| 4,250,688 | 2/1981 | Lingenfelder | 198/429 |
| 4,353,276 | 10/1982 | Ackerfeldt | 83/708 |
| 4,375,845 | 3/1983 | Chambers et al. | 198/570 |
| 4,399,905 | 8/1983 | Lance et al. | 198/422 |
| 4,441,003 | 4/1984 | Eves, II et al. | 219/10.55 A |
| 4,611,801 | 9/1986 | Pessina et al. | 271/150 |

OTHER PUBLICATIONS

One-page publication entitled Powergrip HTD TM Belt Components.

Primary Examiner—Joseph E. Valenza
Attorney, Agent, or Firm—Paul A. Leipold

[57] ABSTRACT

The invention is generally accomplished by providing a plurality of conveyors to which are attached material handling devices. For at least a portion of their travel the material handling devices each travel in the same track or path, although they are attached to separate conveyor mechanisms that travel parallel with each other. This allows the material handling devices attached to one belt to operate at one speed for loading of product and to stop or operate at a different speed for unloading but use the same loading and unloading stations. Each conveyor is independently driven and controlled and each of the parallel conveyors is provided with a series of material handling devices attached to a portion of the conveyor.

22 Claims, 5 Drawing Sheets

MULTIPLE CONVEYORS WITH OVERLAPPING MATERIAL HANDLING DEVICE PATHS

TECHNICAL FIELD

The invention relates to a conveyor system whereby multiple conveyors are arranged such that material handling devices mounted on the conveyors travel in the same path, but may move at different speeds when conveying materials from a common loading place to unloading sites.

BACKGROUND ART

In the formation of many products, particularly consumer products, machines for manufacturing the products operate at very high speeds and deliver enormous numbers of finished products at a rapid rate. These products then must be received, separated into counted groups and packaged. Often the apparatus for grouping and packaging of material is unable to deal with the formation of materials at the same rate as they are being delivered from the forming machine. Therefore, it is often necessary to divide the output from a single machine into several lines for counting and packaging. This requires duplication of equipment and is expensive. Therefore, if possible it is advisable that the conveying equipment attached to a production machine be able to handle all the output of the machine with a single loading place and unloading site for delivery to a packager. However, one difficulty in doing this is that the manufactured items are delivered one at a time from the forming machine whereas the delivery to the packaging machine is best performed in lot sizes that are suitable for packaging. Therefore, the conveyor should be able to gather single items continuously but be able to stop and unload groups of the gathered manufactured materials singly.

In the manufacture of feminine care pads that are commonly wrapped in individual polymer film wrappings and then the individually wrapped pads packaged in polymer bags there is an additional complication in that the pads generally need to be compressed after removal from the individual packaging machine and prior to being placed in the polymer bags as sold to the consumer. The polymer bags must be tightly packed in order to be used most effectively and also to present the best appearance. Therefore, it is preferred that a machine for such use be able to receive the individually wrapped napkins individually, unload them in groups for packaging and also compress the groups of individual packages by an amount that is satisfactory for placement into the large polymer bags for shipping. Prior conveying apparatus has not been required to meet all these needs and additionally operate at a high rate. Further, it has been a practice to utilize two bagging lines for one forming machine allowing switching back and forth between the conveyors so that one can stop for unloading while the other is loading. However, the maintenance of the switching system, dual conveyors and dual baggers is expensive and therefore it would be advantageous to eliminate such dual systems.

DISCLOSURE OF INVENTION

It is an object of the invention to overcome disadvantages of prior conveying apparatus and methods.

It is a further object of the invention to provide a method and apparatus for loading and conveying of materials that allows one speed for the material handling device at the loading place and a second speed at the unloading site while using only one track for movement and handling of the material.

Another object of the invention is to provide an apparatus and method that easily prevents miscounts of material.

A further object is to provide a method and apparatus that provides neat stacks of material.

A further additional object of the invention is to provide a low-cost method and apparatus for material collection and conveying.

These and other objects of the invention are generally accomplished by providing a plurality of conveyors to which are attached material handling devices. The material handling devices move at least in a portion of their travel in the same or an overlapping track or path. The material handling devices are attached to separate conveyor mechanisms that are parallel with each other for at least a portion of their travel. This allows the material handling devices attached to one belt to operate at one speed for loading of product and to stop or operate at a different speed for unloading. Each conveyor is independently driven and controlled. Further, each of the parallel conveyors is provided with a series of material handling units attached to a portion of the conveyor.

MODES FOR CARRYING OUT THE INVENTION

The invention has numerous advantages over prior methods and apparatus. The invention allows material to be delivered at a single receiving station with the conveyor either stopped or moving at a regulated speed while another conveyor is moving at a different speed at the material receiving station. The same loading conveyor, however, may be operated at a different speed or stopped altogether at the unloading station. Further, it is possible with this system that there may be more than two conveyors and that three or more conveyors could be utilized having parallel tracks for the conveyors and the same area of movement of the material handling devices attached to the conveyors. The invention allows the individual conveyors and material handling devices to be operated at high speeds between loading and unloading points while other conveyors and material handling devices are stopped or moving at slow speed for loading and unloading. This may be accomplished without need for devices that split material to be handled into several tracks for loading on the conveyors or the need for separate lines for delivery to packaging or other tertiary handling machines. Further, with the preferred material handling device of the invention products may be compressed after placement in the material handling means and thereby held in good order for packaging of compressed products. These and other advantages will be apparent from the drawings and detailed description below.

DETAILED DESCRIPTION OF THE DRAWINGS

Figure 1:
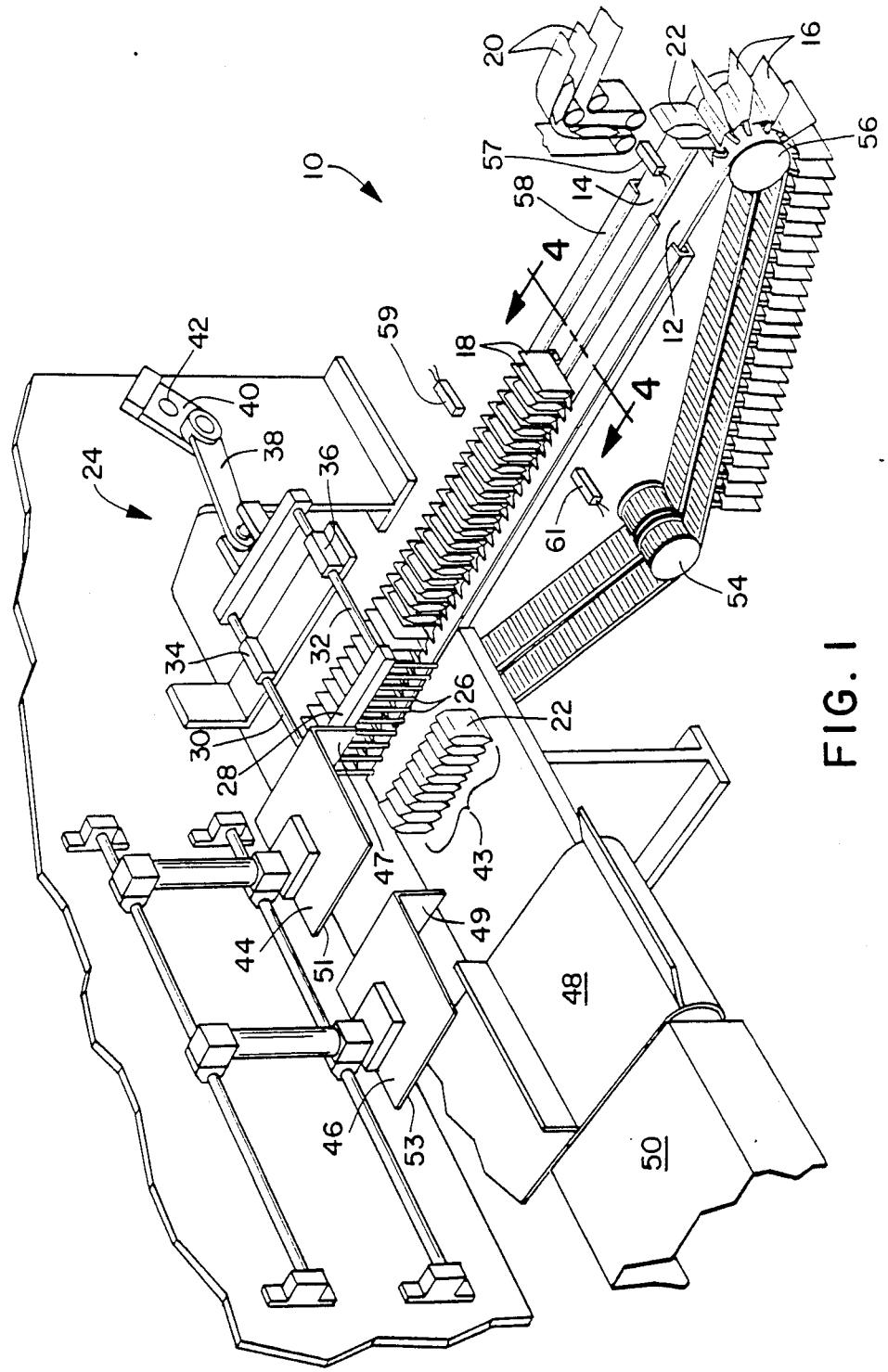
FIG. 1 is a perspective view of a conveying system of the invention.

The conveyor apparatus 10 of FIG. 1 is composed of parallel belt members 12 and 14 each of which carries a series of material handling devices 16 on belt 12 and material handling devices 18 on belt 14. The belts have material delivery device 20 where material 22, such as individual packages of feminine napkins, are placed between the material holder members 16 and 18. The belts then travel to the unloading section 24 where the material 22 is unloaded by being pushed by prongs 26. The prongs are attached to carrier 28 and actuated by moveable arms 30 and 32 that ride in bearings 34 and 36. The arms 30 and 32 are moved by arm 38 that is actuated by rotation of rotational member 40 around pivot point 42. The groups of material 22 in sections such as 43 may be further located by pusher devices 44 and 46 that place the material 22 onto conveyor 48 or to the bagger or boxer represented by 50. The pusher devices 44 and 46 are provided with downturned ends 47 and 49 respectively. If desired ends 51 and 52 also could be provided with downturned ends to better control products 43. It is noted that several groups of products 43 would ordinarily be gathered prior to movement by handlers 44 and 46 to the bagger 50. As illustrated in FIG. 1 the material handling devices 16 or belt 12 are moving slowly at such a rate to catch material 22 as it exits from delivery belts 20. At the same time material handling devices 18 attached to belt 14 are moving in an intermittent manner that advances the belt ten units of material at a time. After the belt stops the fingers 26 are advanced to push the material from devices 18 carried by belt 14.

Figure 1A:
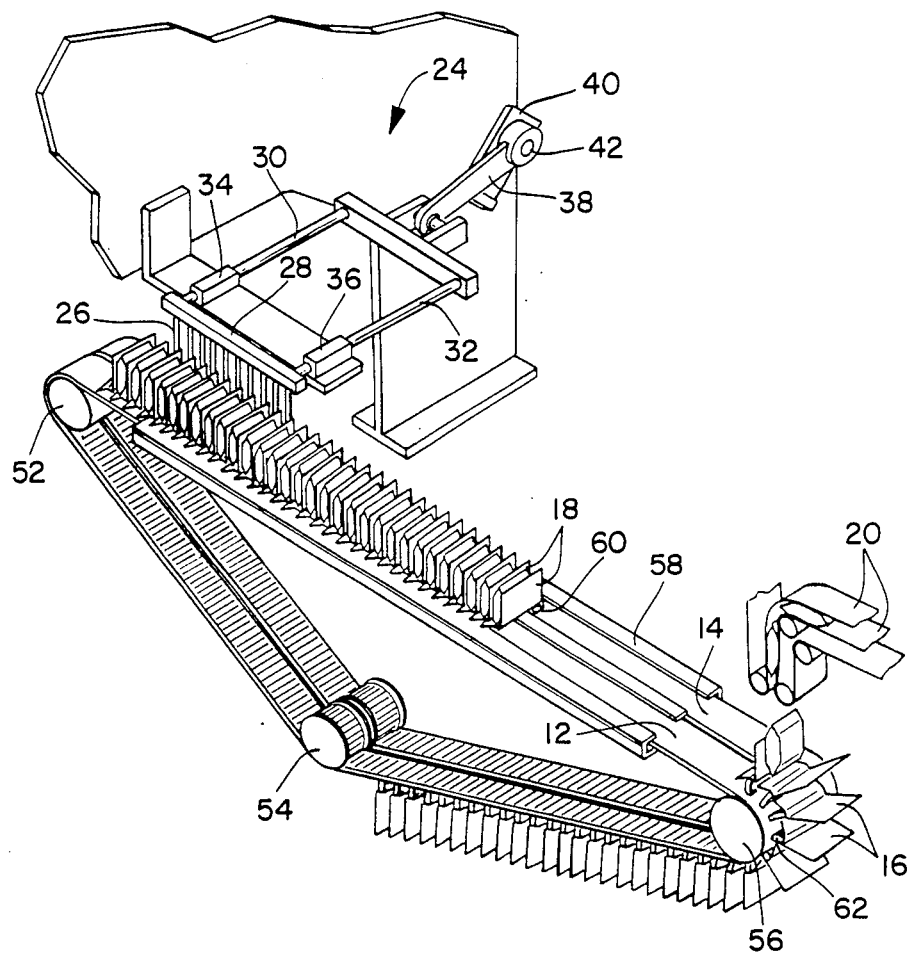
FIG. 1A is an fragmentary perspective view of the conveyor portion of FIG. 1.

FIG. 1A illustrates the removeable device 24 in a position prior to pushing material from the belt 14. Also better illustrated in FIG. 1A are the means of driving belts 14 and 12. The belts travel on grooved sprocket pairs 52, 54 and 56. Each sprocket is free to move independently of the sprocket with which it is paired. It is understood that while the belts 12 and 14 are shown as following a triangular path they could also be placed only over sprocket pairs 52 and 56. The sprockets 52 are driven independently by means (not shown) such as stepping motors that are independently attached and individually controlled to drive each belt. The belts are toothed belts such as the Uniroyal Power Grip HTD TM belts.

Figure 4:
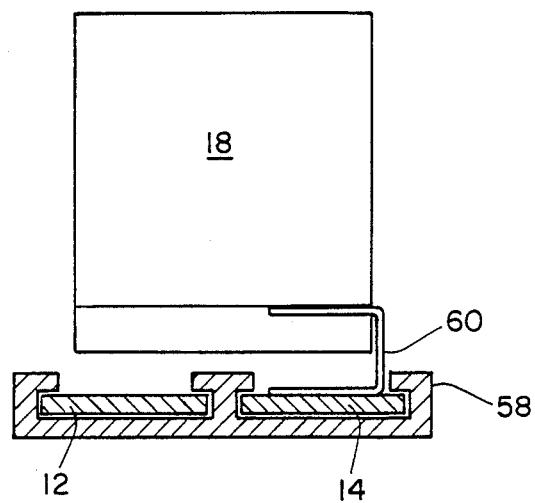
FIG. 4 is a view along cross-sectional line 4—4 of FIG. 1.

The belts ride in a grooved mechanism 58 to maintain exact placement of the belt in the unloading zone. As illustrated in FIG. 4 the material handling devices 18 are attached to the belt 12 by brackets 60. The brackets are arranged such that they do not interfere with movement of the belt through holding device 58. The material handling devices 16 on belt 12 have their brackets 62 fastened to the opposite side of the material handling devices 16 such that the material handling devices 16 may have exactly the same path as material handling devices 18.

The apparatus of FIG. 1 further may be provided with sensing devices that determine the proper location of the packaged items packaged items and regulate the apparatus 10 in response to improperly placed or missing material 22. Sensor 57 is adapted to sense when packages are entering from conveyor 20 and can be utilized to regulate the speed of loading of the conveyor. Sensor 59 can be utilized to sense the height of material 22 between vanes 16. If material 22 is too high they may not properly package and handle at further stages. Sensing them at 59 allows these packages to be cycled to discard rather than packaged. Sensor 61 will sense missing packages in order to insure accurate count in the packaging device 50. Other sensors may be utilized as needed to regulate the speed of the belts as well as detect improper materials that should be discarded.

Figure 2:
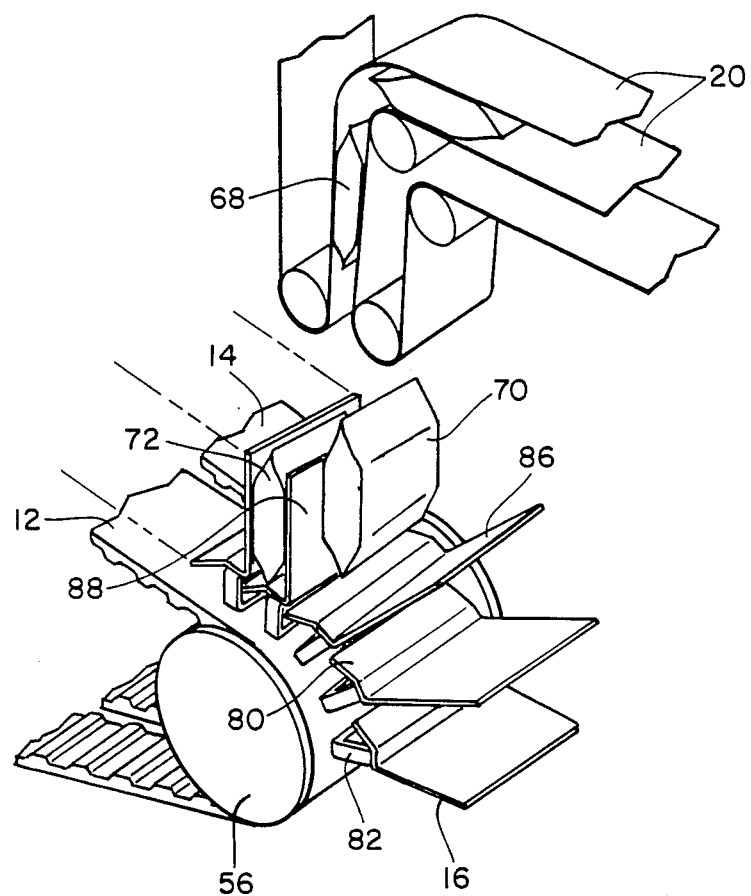
FIG. 2 is a fragmentary perspective view of the loading portion of the apparatus of the invention.
Figure 3:
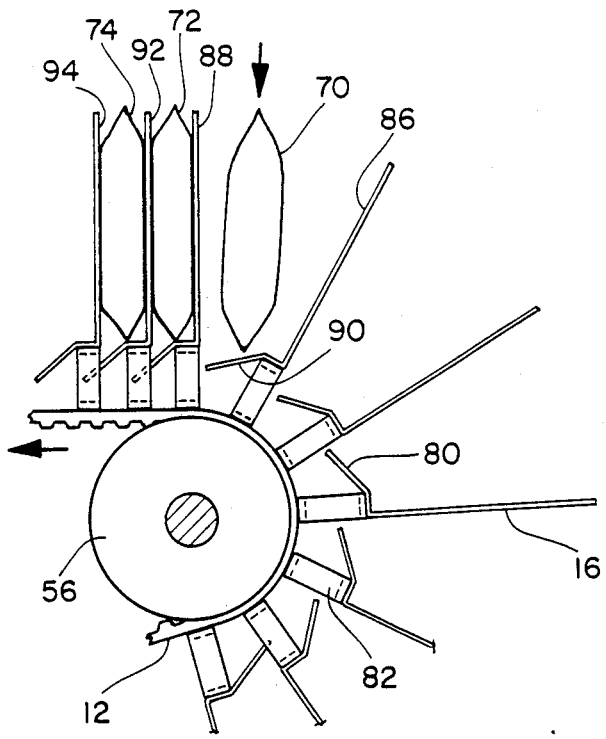
FIG. 3 is a fragmentary side plan view of the loading portion of the apparatus.

FIGS. 2 and 3 illustrate the advantages of the preferred loading system of the invention. As illustrated in FIGS. 2 and 3 the belt 12 moving on one of the rollers 56 is carrying several material handling devices 16 that are each provided with a lip 80. The material handling devices 16 further are extended from the belt 12 by the support means 82. The wrapped feminine pads 68 drop from belts 20 where they are exiting the individual bagging machine into the open space formed by material handling members 86 and 88. Members 86 and 88 are widely spread. They are spread by a greater distance than they would be if the members 86 and 88 were directly mounted on belt 12. The extension of the devices 82 creates a greater radius in passing over sprocket 56 as the devices 82 are on an extended radius. Further the opening between 86 and 88 is wide to enable the wrapped feminine pad 70 to easily drop into the space. The lip 90 on the material handling device 86 prevents the wrapped pad 70 from dropping below the level of lip 90 on the material handling device 86. As the belt 12 advances the pads are compressed. Compressed pads are shown between members 88 and 92 and between members 92 and 94. As the pad is compressed the lip 90 will fit underneath the material handling device 88 ahead of it on the belt as the device leaves roller 56. Wrapped pads 72 and 74 are compressed and suitable for packaging in cardboard boxes or polymer film bags with use of minimum space for packaging.

Alternatively, if the material did not need to be compressed after loading, the spacing of the members 88, 92 and 94 would be such that the material would fit between them without any compression when the belt was being driven horizontally.

Figure 5:
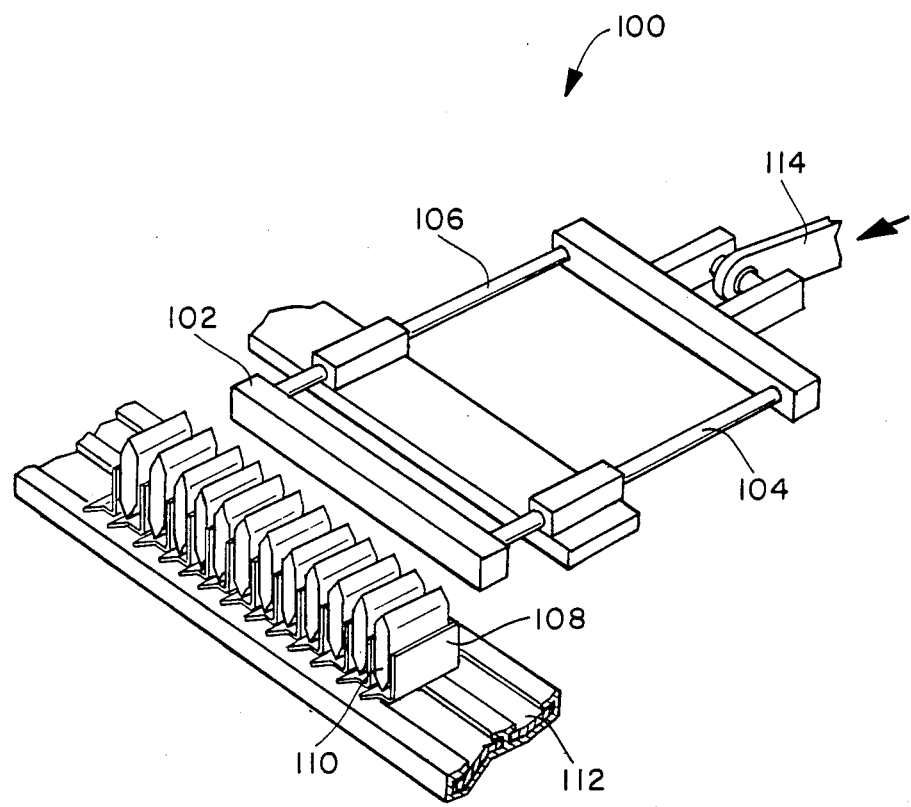
FIG. 5 illustrates an alternative method and apparatus for material handling and unloading.

An alternate unloading and material handling system 100 is illustrated in FIG. 5. In the unloading system 100 the removal of the packages is done by pusher bar 102 carried by rods 104 and 106. The material handling vanes 108 are of a height less than that of the packages 110. Therefore, the pusher bar 102 moves over the top of the material handling devices 108 and pushes the packages carried by belt 112. This device is simpler in that the bar does not require the calibration of the material handling devices with pusher fingers as in the preferred embodiment. The pusher bar 102 is controlled by the cams bar 114.

The invention has been described as utilizing parallel conveyors. Parallel conveyors are intended to be conveyors that are traveling on tracks that are generally beside and an equal distance from each other in either a straight or curved path. However, the invention also includes those conveyors that travel on parallel paths such that the material handling devices carried by the conveyors are on substantially the same path for only a portion of each conveyor's travel. For instance, conveyors could be utilized to receive material from a packaging machine at a single point but then divide from parallel paths to deliver product to separate packaging machines. Also, conveyors could be utilized where the material handling devices were in substantially the same path at the unloading point but received material from two separate sources at a point in the individual conveyor path where they were not parallel. This would still take advantage of the apparatus and process of the invention wherein material handling devices on separate conveyors travel substantially the same path so that their speed may be controlled separately at different points of their travel.

While the invention has been illustrated with the receiving, collection and transport of individually wrapped sanitary napkin packages it could be utilized for transport of any material for collection and packaging. Typical of such materials would be diapers, incontinence garments, candy, canned goods, bottled goods or any other product that is produced individually and packaged in groups. Further, while the apparatus has been illustrated with handling of packages, the apparatus also could be used to collect particulate matter or liquids by closing the material handling units mounted on the conveyors to form bins. The invention, in which material handling devices travel over the same path while guide belts are on parallel paths, also may find use in treatment apparatus such as dishwashers or bakery ovens. For instance, the material could be transported slowly through a baking section and then rapidly moved to packaging area and then to a reloading area. Therefore, the invention is only intended to be limited by the breadth of the claims attached hereto.

I claim:

1. Apparatus for collection and transport comprising a plurality of material handling means carried by each of a plurality of conveyor belts, independent drive means comprising sprockets located in the center of each of said plurality of said belts to move each of said plurality of conveyor means, wherein said material handling means move for at least a portion of their travel in the same path irrespective of which of said conveyor means to which they are attached, wherein said conveyors are provided with control means for continuous movement while said belts are loaded and control means to stop or slow said conveyor during unloading, and wherein said material handling means attached to each of said plurality of conveyor belts extends unsupported over the remainder of said plurality of belts during at least a portion of their travel.

2. The apparatus of claim 1 wherein said conveyor belts operate on parallel tracks for at least a portion of their travel.

3. The apparatus of claim 1 wherein said material handling means comprise generally L-shaped vanes.

4. The apparatus of claim 1 wherein said plurality of material handling means are grouped together on each conveyor means.

5. The apparatus of claim 1 further comprising means to independently control the speed of each conveyor means.

6. The apparatus of claim 2 wherein said material handling means are mounted to said conveyors by brackets that extend said material handling devices away from said conveyor.

7. The apparatus of claim 2 wherein a loading means for said material handling means is provided at the point said conveyors pass over a turning pulley.

8. The apparatus of claim 1 further comprising unloading means that remove material from said material handling means.

9. The apparatus of claim 1 wherein said conveyor means are provided with means to separate said material handling means at a greater distance for loading than unloading.

10. The apparatus of claim 1 further comprising loading means to load material into said material handling means.

11. A method of collection and transport comprising providing a plurality of sprocket driven belt conveyors, providing each conveyor with a plurality of material handling means, adjusting the speed of at least one conveyor to receive products into said material handling means, simultaneously adjusting the speed of at least one second conveyor to a second speed, with the proviso that said material handling means follow overlapping paths for at least a portion of their travel, said belts are moving during said loading and slowed or stopped during unloading, the bottom of said material handling means is separated from said conveying means by being mounted on a bracket which is moutned on one of said belt conveyors such that said material handling means are spearated by a greater distance when said material handling means pass around the conveyor drive rolls during loading than they would be if directly connected to said belt and each of said material handling means attached to each of said plurality of belt conveyors extends unsupported over the remainder of said plurality of belt conveyors during a portion of their travel.

12. The method of claim 11 wherein said at least one second conveyor is stopped for unloading at the same time at least one conveyor is moving at said adjusted speed for unloading.

13. The method of claim 11 wherein said material handling means are spaced at a greater distance for loading than unloading.

14. The method of claim 11 wherein said material handling means compress said product prior to unloading.

15. The method of claim 13 wherein said material handlers are on a turning roll during loading.

16. The method of claim 11 wherein said conveying means are stopped for unloading.

17. The method of claim 11 wherein said material handling means follow substantially the same path.

18. The method of claim 11 wherein said products comprise individually wrapped consumer products.

19. The apparatus of claim 1 wherein said material handling means compress said material between loading and unloading.

20. The apparatus of claim 1 wherien said drive means comprise sprocketed rolls that are adjacent pair of independently driven rolls.

21. The apparatus of claim 5 wherein said material handling means are provided with an extended lip that fits under the next forward material handling means during travel and is exposed when said material handling means are more widely separated as they pass over a turning pulley such that material will not drop down below said extended lip to said bracket.

22. The method of claim 11 wherein said material handling means are provided with a lip that nests under the next forward material handling means during straight movement of said conveyors and is exposed to prevent said products from dropping below the level of said lip during loading.

* * * * *